April 28, 1970     F. C. PALILLA     3,509,065
METHOD OF MAKING ALKALINE EARTH PHOSPHATE PHOSPHORS
Filed June 25, 1968     3 Sheets-Sheet 1

INVENTOR.
FRANK C. PALILLA
BY R. J. Frank
ATTORNEY.

INVENTOR.
FRANK C. PALILLA
BY R. J. Frank
ATTORNEY.

INVENTOR.
FRANK C. PALILLA
BY R. J. Frank
ATTORNEY.

United States Patent Office 3,509,065
Patented Apr. 28, 1970

3,509,065
METHOD OF MAKING ALKALINE EARTH PHOSPHATE PHOSPHORS
Frank C. Palilla, Maspeth, N.Y., assignor to General Telephone & Electronics Laboratories Incorporated, a corporation of Delaware
Continuation-in-part of application Ser. No. 621,807, Mar. 9, 1967. This application June 25, 1968, Ser. No. 785,406
Int. Cl. C09k 1/36, 1/06
U.S. Cl. 252—301.4   8 Claims

ABSTRACT OF THE DISCLOSURE

A method of preparing divalent europium activated halogenated alkaline earth phosphate phosphors by a process employing a reducing atmosphere wherein excess halogen is included in the formulation. The resulting phosphors may be used in fluorescent lamps and in cathodoluminescent screens for cathode-ray tubes. In particular, the response of these materials to cathode ray radiation is substantially greater than that of known phosphors of similar composition. Alkaline earth phosphate phosphors activated by certain other elements of the lanthanide series are also disclosed.

CROSS-REFERENCES TO RELATED APPLICATIONS

This application is a continuation-in-part of my U.S. patent application Ser. No. 621,807 filed Mar. 9, 1967, now abandoned.

BACKGROUND OF THE INVENTION

This invention relates to fluorescent materials and to methods of making fluorescent materials which emit light when exposed to ultraviolet, cathode ray or X-ray radiation. In particular, it relates to methods of preparing halogenated alkaline earth phosphate phosphors activated by selected elements of the lanthanide series.

Phosphor compositions are well known in which the host material is a halogenated alkaline earth phosphate and the activator element is lead, manganese, antimony or tin. Generally, the host for a phosphor of this group has the apatite structure, a typical example being calcium chlorophosphate $3Ca_3(PO_4)_2 \cdot CaCl_2$. Many modifications are possible including partial substitutions of the alkaline earth cations by other divalent metals such as zinc and cadmium. Also, partial substitutions of the chloride by fluoride ions is desirable for some applications.

Phosphor materials which result from these combinations generally exhibit good luminescence when stimulated by short (253.7 nanometers) ultraviolet radiation, the response being greatest when the materials are synthesized to produce small deviations from stoichiometry. In particular, activation by combinations of antimony and manganese will produce a wide spectrum of luminescent emissions from alkaline earth phosphates excited by ultraviolet light. Thus, these phosphors have wide application in fluorescent lamps and may be adjusted in composition to provide white light which varies from "cool" to "warm" white.

While the described known phosphors have good luminescent properties under short ultraviolet excitation, it would be desirable to improve their response under cathode ray radiation. Accordingly, I have invented a method of preparing lanthanide activated halogenated alkaline earth phosphate phosphors which exhibit excellent response to cathode rays as well as to X-ray and ultraviolet radiation. The brightness of these phosphors increases linearly with increasing electron beam current over a wide range of beam currents making the new materials especially desirable as the blue-emitting phosphor component in cathode ray tube screens used in color television receivers. In addition, the method described herein permits control of particle size of the phosphor and results in larger average particle size than can be obtained by previously known methods.

SUMMARY OF THE INVENTION

The present invention comprises a method of preparing lanthanide activated halogenated alkaline earth phosphate phosphors which exhibit excellent luminescence under cathode ray excitation. The resultant phosphor compositions are defined by the formula

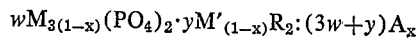

$$wM_{3(1-x)}(PO_4)_2 \cdot yM'_{(1-x)}R_2 : (3w+y)A_x$$

where M and M' are elements of the alkaline-earth series, R is an ion selected from the halogen group, A is an activator selected from the group consisting of divalent europium, divalent ytterbium, trivalent dysprosium, trivalent terbium and trivalent cerium, the ratio of $y$ to $w$ is either approximately one-third or approximately unity, and $x$ has a value selected to produce fluorescence when the composition is excited by cathode ray, ultraviolet or X-ray radiation. When the ratio $y/w$ equals approximately one-third, the resulting phosphor possesses an apatite structure and when the ratio $y/w$ equals approximately unity, the phosphor has a spodiosite structure. The value of $x$ required to produce fluorescence under ultraviolet or cathode ray excitation is between 0.0025 and 0.10 gram-atom per gram atom of each host cation (M+M').

In those cases where the activator is $Dy^{3+}$, $Tb^{3+}$ and $Ce^{3+}$ no intentional means are used to compensate for the charge difference between the trivalent activators and the divalent cation it replaces. As is well known in the art, charge compensation takes place by any of several mechanisms such as host cation vacancies, interstitial halide ions or partial replacement of singly charged halide ions by doubly charged oxide ions.

In accordance with my method, appropriate amounts of an alkaline earth phosphate, an alkaline earth halide and a lanthanide compound selected from the group consisting of the lanthanide oxides and lanthanide salts are blended at room temperature. The ratio $y/w$ of alkaline earth halide to alkaline earth phosphate is chosen to provide an excess of halide over that remaining in the final composition. The blend is next fired in a substantially pure hydrogen atmosphere at a temperature in the range 800° C. to 1400° C. for between 1 and 3 hours. After firing, the melt is removed from the furnace and allowed to cool to room temperature. The fired blend is defined by the formula given above for the final composition except that the ratio $y/w$ is in the range 1 to 3 which is equivalent to the initial nominal formulation less any ingredients volatilized during the firing procedure. That is, there is an excess of alkaline earth halide in the composition at this point in the procedure as compared with that in the final phosphor composition.

The sample is next washed with water at a temperature close to boiling several (3–5) times over the period of about one hour to remove all excess alkaline earth halide.

These materials, under short and long ultraviolet (200 to 400 nanometers) radiation, X-ray and cathode ray excitation, yield phosphors which exhibit deep blue to yellow emission when activated by $Eu^{2+}$, $Tb^{3+}$, $Ce^{3+}$, and $Yb^{3+}$ and yellow-white emission when activated by $Dy^{3+}$. Thus, they are useful in a variety of applications including fluorescent lamps and cathode-ray tubes. The brightness of the phosphors changes linearly with variation in electron beam current making them particularly suitable for use in cathode-ray tubes. Further, the blue color of the light emitted under ultraviolet excitation makes the Eu²⁺ activated phosphors suitable for blue color correction in fluorescent lamps.

The efficient response of phosphor prepared by my method under cathode-ray excitation is due to the use of amounts of alkaline earth halide and alkaline-earth phosphate which results in an excess of alkaline earth halide in the fired blend. It is also found that firing in pure hydrogen contributes to this enhancement. In all of the following examples the phosphors are referred to, for clarity, by their nominal formulations prior to washing to remove the excess alkaline earth halide. It shall be understood that in the final phosphor compositions the ratio $y/w$ is one-third or unity although the ratio $y/w$ is in the range 1 to 3 in the formulation. In the final products, the unity ratio results when Ca is the predominant host cation and the synthesis is conducted at 1000° C. or less.

DESCRIPTION OF THE PREFERRED EMBODIMENTS

Figure 1:
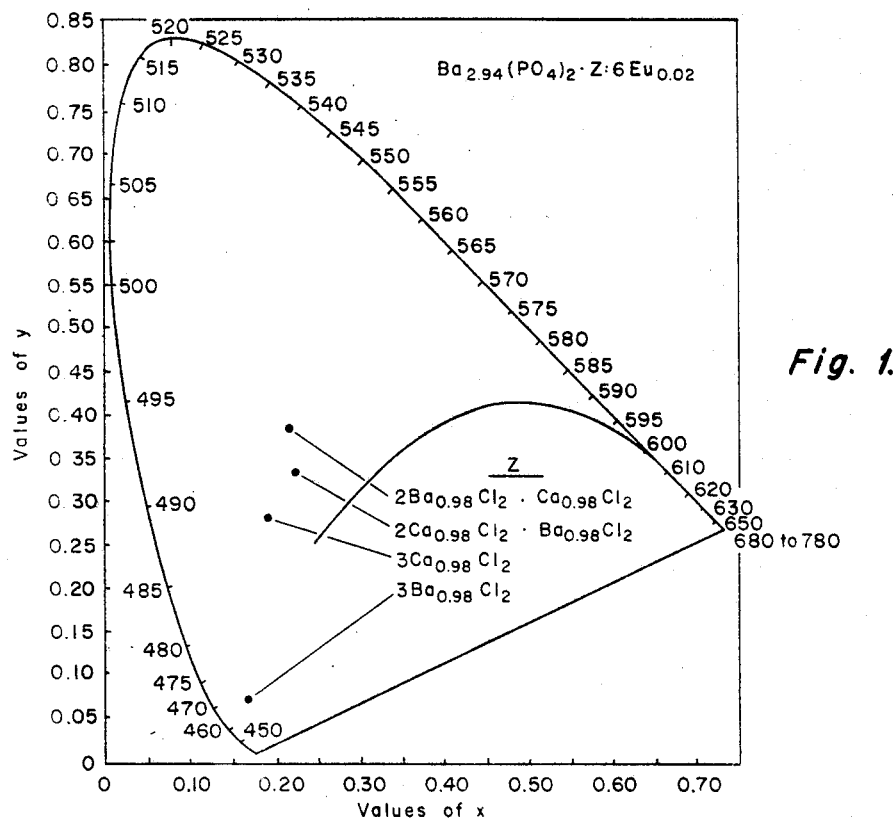
FIG. 1 is a C.I.E. chromaticity diagram showing the color coordinates of phosphors prepared by my method.

Example I 13.36 grams of SrHPO₄, 10.10 grams of BaCl₂ and 0.66 gram of Eu₂O₃ were dry blended at room temperature, placed in a molybdenum crucible and fired at 1200° C. in a hydrogen atmosphere for 2 hours. In lieu of Eu₂O₃, other sources for Eu such as the halides EuF₃ and EuCl₃ may be used. After firing, the melt was removed and allowed to cool to room temperature providing a sample having the formulation

$$Sr_{2.91}(PO_4)_2 \cdot 2Ba_{0.97}Cl_2 : 5Eu^{2+}_{0.03}$$

The sample was then washed in hot water at a temperature of about 100° C. for about 60 minutes to remove any excess halide, dried and sieved through a 200 mesh screen.

The emission from the resulting phosphor was compared with that from silver activated zinc sulfide, a blue-emitting phosphor used in commercial color television cathode ray tubes. Using ZnS:Ag as a standard it was found that the divalent europium activated strontium barium chlorophosphate has a luminescent intensity 98% of the ZnS:Ag under cathode ray excitation. The chromaticity coordinates of the new phosphor are $x=0.154$, $y=0.192$ as compared to $x=0.149$, $y=0.052$ for the ZnS:Ag. (The symbols $x$ and $y$ are conventionally used to represent the chromaticity coordinates on the C.I.E. diagram and should not be confused with the symbols $x$ and $y$ in the formula for the phosphor system.)

The luminescent intensity of the alkaline earth phosphate increases linearly as the electron beam current density is increased to one ampere per square centimeter. In contrast, the output of the ZnS:Ag is nonlinear at a beam current density of this magnitude; i.e., a given change in beam current at a high current level produces less change in brightness than the same electron beam current change produces at low beam currents.

Under excitation by a short ultraviolet lamp the response of phosphors having the formulation $$Sr_{2.91}(PO_4)_2 \cdot 2Ba_{0.97}Cl_2 : 5Eu^{2+}_{0.03}$$

prior to washing is 153 percent of thin activated strontium pyrophosphate Sr₂P₂O₇:Sn, a commercial ultraviolet excited phosphor used in fluorescent lamps.

Example II 86.23 grams of BaHPO₄, 39.24 grams of SrCl₂ and 1.10 grams of Eu₂O₃ were dry blended at room temperature, placed in a covered platinum crucible, and fired in a furnace at 1000° C. in air for two hours. The mixture was then ground with mortar and pestle and placed in a molybdenum crucible at 1000° C. The temperature was gradually raised to 1200° C., the sample being fired in a hydrogen atmosphere for a two hour period and then removed from the furnace and allowed to cool to room temperature providing a sample having the formulation $$Ba_{2.97}(PO_4)_2 \cdot 2Sr_{0.99}Cl_2 : 5Eu^{+2}_{0.01}$$

The sample was then washed in hot water, dried and sieved through a 200 mesh screen.

The brightness of the resulting phosphor was found under cathode ray excitation to be 89 percent of that exhibited by the standard ZnS:Ag. The C.I.E. color coordinates were $x=0.152$, $y=0.165$. Under ultraviolet excitation the brightness was 143 percent of Sr₂P₂O₇:Sn.

Example III

The effect of changes in the europium concentration was established by preparing by the method of Example I several batches of phosphors having the formulation prior to washing the remove excess alkaline earth halides $Sr_{3(1-x)}(PO_4)_2 \cdot 2Sr_{(1-x)}Cl_2 : 5Eu_x$, $x$ being varied from 0.0025 to 0.10. The ingredients used in each batch are given in Table I.

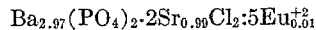

TABLE I

| $x$ | SrHPO₄ (grams) | SrCl₂ (grams) | Eu₂O₃ (grams) |
|---|---|---|---|
| 0.0025 | 13.74 | 7.91 | 0.06 |
| 0.005 | 13.70 | 7.89 | 0.11 |
| 0.01 | 13.63 | 7.85 | 0.22 |
| 0.02 | 13.50 | 7.77 | 0.44 |
| 0.03 | 13.36 | 7.69 | 0.66 |
| 0.05 | 13.08 | 7.53 | 1.10 |
| 0.10 | 12.39 | 7.13 | 2.20 |

The brightness under cathode ray excitation and the C.I.E. color coordinates of these phosphors are shown in Table II.

TABLE II

| Formulation prior to washing | Relative brightness, percent | C.I.E. color coordinates $x$ | $y$ |
|---|---|---|---|
| $Sr_{2.99}(PO_4)_2 \cdot 2 Sr_{0.9975}Cl_2 : 5 Eu^{2+}_{0.0025}$ | 64.0 | 0.154 | 0.028 |
| $Sr_{2.985}(PO_4)_2 \cdot 2 Sr_{0.995}Cl_2 : 5 Eu^{2+}_{0.005}$ | 79.5 | 0.153 | 0.028 |
| $Sr_{2.97}(PO_4)_2 \cdot 2 Sr_{0.99}Cl_2 : Eu^{2+}_{0.01}$ | 94.5 | 0.153 | 0.028 |
| $Sr_{2.94}(PO_4)_2 \cdot 2 Sr_{0.98}Cl_2 : 5 Eu^{2+}_{0.02}$ | 83.0 | 0.152 | 0.031 |
| $Sr_{2.91}(PO_4)_2 \cdot 2 Sr_{0.97}Cl_2 : 5 Eu^{2+}_{0.03}$ | 100.0 | 0.152 | 0.033 |
| $Sr_{2.85}(PO_4)_2 \cdot 2 Sr_{0.95}Cl_2 : 5 Eu^{2+}_{0.05}$ | 85.0 | 0.153 | 0.039 |
| $Sr_{2.70}(PO_4)_2 \cdot 2 Sr_{0.90}Cl_2 : 5 Eu^{2+}_{0.10}$ | 68.0 | 0.157 | 0.061 |

Example IV

A series of phosphors were prepared by the method of Example I in which the initial or starting ratio $y/w$ of halide to phosphate was varied between 1 and 3. The response of these phosphors to cathode ray and ultraviolet excitation are given in Table III. The materials of groups (a) and (b) emit blue to blue-green light under cathode ray excitation and have been compared with a standard commercially available blue-cathodo-luminescent phosphor, silver activated zinc sulfide. Under ultraviolet excitation, the phosphors of group (a) are blue-emitting and have been compared with a standard ultraviolet responsive phosphor, tin activated strontium pyrophosphate Sr₂P₂O₇:Sn. The phosphors of group (b) have been compared under ultraviolet excitation with an efficient green-emitting phosphor, manganese-activated zinc silicate.

In this series of phosphors, the average particle size of the products increases as the initial $y/w$ ratio goes from 1 to 3. For example, where the starting $y/w$ ratio is 2, the average particle diameter is about 15 microns in the final product but where the starting $y/w$ ratio is 3, the average particle diameter is about 60 microns.

TABLE III

| Formulation prior to washing | Relative Brightness | |
|---|---|---|
| | Cathode-ray excitation | Ultraviolet excitation |
| | Group (a) | |
| | (ZnS:Ag=100) | ($Sr_5P_2O_7$:Sn=100) |
| $Ca_{2.97}(PO_4)_2 \cdot 1\ Ca_{0.99}Cl_2:4\ Eu^{2+}_{0.01}$ | 6.0 | 11.9 |
| $Ca_{2.97}(PO_4)_2 \cdot 2\ Ca_{0.99}Cl_2:5\ Eu^{2+}_{0.01}$ | 46.0 | 47.5 |
| $Ca_{2.97}(PO_4)_2 \cdot 3\ Ca_{0.99}Cl_2:6\ Eu^{2+}_{0.01}$ | 39.0 | 41.3 |
| $Sr_{2.94}(PO_4)_2 \cdot 1\ Sr_{0.98}Cl_2:4\ Eu^{2+}_{0.02}$ | 16.2 | 13.1 |
| $Sr_{2.94}(PO_4)_2 \cdot 2\ Sr_{0.98}Cl_2:5\ Eu^{2+}_{0.02}$ | 28.0 | 30.0 |
| $Sr_{2.94}(PO_4)_2 \cdot 3\ Sr_{0.98}Cl_2:6\ Eu^{2+}_{0.02}$ | 31.4 | 32.5 |
| $Sr_{2.91}(PO_4)_2 \cdot 2\ Ca_{0.97}Cl_2:5\ Eu^{2+}_{0.03}$ | 100.0 | 96.2 |
| $Sr_{2.91}(PO_4)_2 \cdot 3\ Ca_{0.97}Cl_2:6\ Eu^{2+}_{0.03}$ | 70.0 | 87.5 |
| | Group (b) | |
| | (ZnS:Ag=100) | ($ZnSiO_4$:Mn=100) |
| $Ba_{2.97}(PO_4)_2 \cdot 2\ Ca_{0.99}Cl_2:5\ Eu^{2+}_{0.01}$ | 86.0 | 65.0 |
| $Ba_{2.97}(PO_4)_2 \cdot 3\ Ca_{0.99}Cl_2:6\ Eu^{2+}_{0.01}$ | 139.0 | 51.3 |
| $Ba_{2.91}(PO_4)_2 \cdot 2\ Ca_{0.97}Cl_2:5\ Eu^{2+}_{0.03}$ | 120.0 | 75.0 |
| $Ba_{2.91}(PO_4)_2 \cdot 3\ Ca_{0.97}Cl_2:6\ Eu^{2+}_{0.03}$ | 160.0 | 66.2 |

Example V

Selected phosphors of Examples II and III were incorporated in 15 watt fluorescent lamps. The spectral emission, lumen output and maintenance were compared to that obtained from a standard commercial phosphor $Sr_2P_2O_7$:Sn as shown in Table IV.

TABLE IV

| Initial formulation | Brightness in Lumens | | | |
|---|---|---|---|---|
| | Initial | 100 hours | 500 hours | 1,700 hours |
| $Sr_2P_2O_7$: (Standard) | 1,477 | 1,361 | 1,300 | 1,240 |
| $Ba_{2.97}(PO_4)_2 \cdot 2\ Sr_{0.99}Cl_2:5\ Eu^{2+}_{0.01}$ | 1,510 | 1,461 | 1,404 | 1,290 |
| $Sr_{2.94}(PO_4)_2 \cdot 2\ Sr_{0.98}Cl_2:5\ Eu^{2+}_{0.02}$ | 499 | 478 | 472 | 449 |
| $Sr_{2.91}(PO_4)_2 \cdot 2\ Sr_{0.97}Cl_2:5\ Eu^{2+}_{0.03}$ | 915 | 878 | 869 | 830 |

As shown in Table IV, the formulation $$Ba_{2.97}(PO_4)_2 \cdot 2\ Sr_{0.99}\ Cl_2:5\ Eu^{2+}_{0.01}$$

yields a higher initial brightness than $Sr_2P_2O_7$:Sn. It is reduced in brightness to only 97% of the initial value after 100 hours as compared to 92% for the standard. The formulations $Sr_{2.94}(PO_4)_2 \cdot 2\ Sr_{0.98}\ Cl_2:5\ Eu^{2+}_{0.02}$ and $Sr_{2.91}(PO_4)_2 \cdot 2\ Sr_{0.97}\ Cl_2:5\ Eu^{2+}_{0.03}$ exhibit lower brightness but are more saturated than the other two materials.

Example VI

A number of divalent europium activated phosphors were prepared by the method of Example I. These phosphors are referred to by the formulation $$M_{2.95}\ (PO_4)_2 \cdot Z:6\ Eu^{2+}_{0.02}$$

where M is barium, strontium, or calcium and Z is 3 $M'_{0.98}Cl_2$ where M' is barium, calcium, strontium or combinations thereof.

Each of the phosphors was excited by an electron beam and its color represented on a conventional C.I.E. (Commission International d'Eclairage) chromaticity diagram such as that shown in FIGS. 1–9. It was found that, in general, the light emitted by the phosphor becomes brighter for the same density of electron excitation as the saturation of the color decreases.

Figure 2:
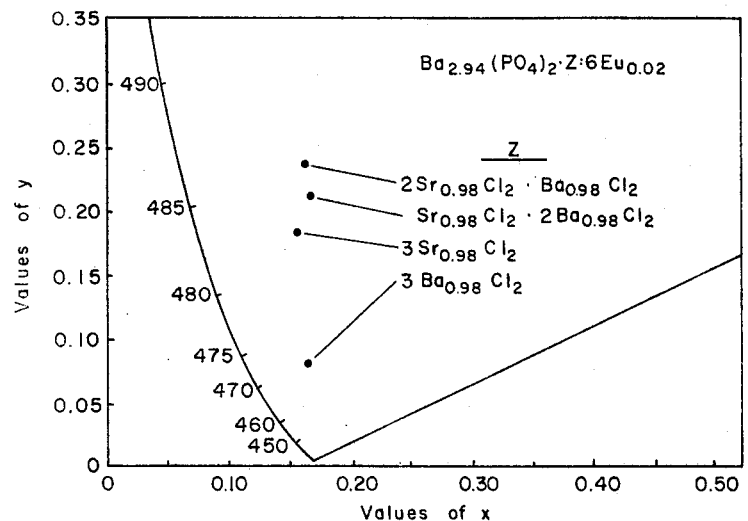
FIGS. 2–9 are portions of a C.I.E. diagram showing the color coordinates of other phosphors prepared by this method.
Figure 3:
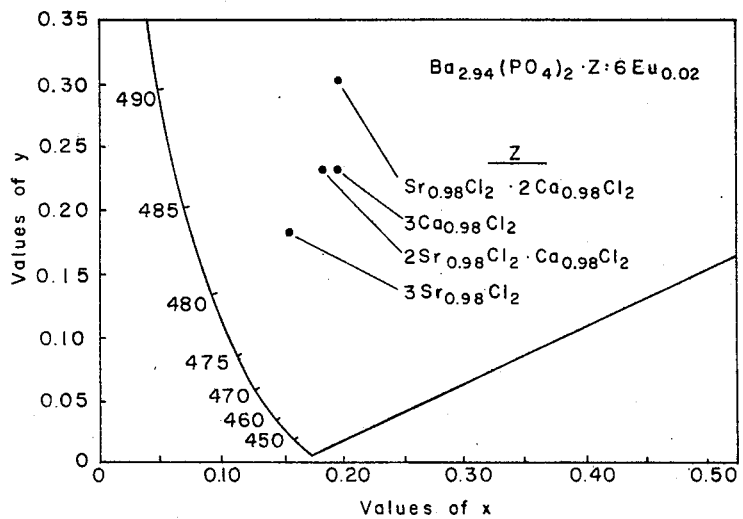

Phosphors derived from the following formulations were prepared and their $x$, $y$ coordinates computed and plotted in FIGS. 1–3.

TABLE V

| $Ba_{2.94}(PO_4)_2 \cdot Z:6\ Eu^{2+}_{0.02}$ | | C.I.E. color coordinates | |
|---|---|---|---|
| Z | Figure | $x$ | $y$ |
| 2 $Ba_{0.98}Cl_2 \cdot Ca_{0.98}Cl_2$ | 1 | 0.218 | 0.381 |
| 2 $Ca_{0.98}Cl_2 \cdot Ba_{0.98}Cl_2$ | 1 | 0.222 | 0.339 |
| 3 $Ca_{0.98}Cl_2$ | 1 | 0.194 | 0.281 |
| 3 $Ba_{0.98}Cl_2$ | 1 | 0.165 | 0.082 |
| 2 $Sr_{0.98}Cl_2 \cdot Ba_{0.98}Cl_2$ | 2 | 0.161 | 0.236 |
| $Sr_{0.98}Cl_2 \cdot 2\ Ba_{0.98}Cl_2$ | 2 | 0.164 | 0.212 |
| 3 $Sr_{0.98}Cl_2$ | 2 | 0.155 | 0.183 |
| 3 $Ba_{0.98}Cl_2$ | 2 | 0.165 | 0.082 |
| $Sr_{0.98}Cl_2 \cdot 2\ Ca_{0.98}Cl_2$ | 3 | 0.195 | 0.303 |
| 2 $Sr_{0.98}Cl_2 \cdot Ca_{0.98}Cl_2$ | 3 | 0.181 | 0.281 |
| 3 $Ca_{0.98}Cl_2$ | 3 | 0.194 | 0.281 |
| 3 $Sr_{0.98}Cl_2$ | 3 | 0.155 | 0.183 |

The compositions in each series wherein Z comprises two alkaline earths used in the formulations have "$y$" coordinates which are generally higher than those of compositions in which Z consists of a single alkaline earth. The compositions having higher "$y$" coordinates are also more luminous.

Figure 4:
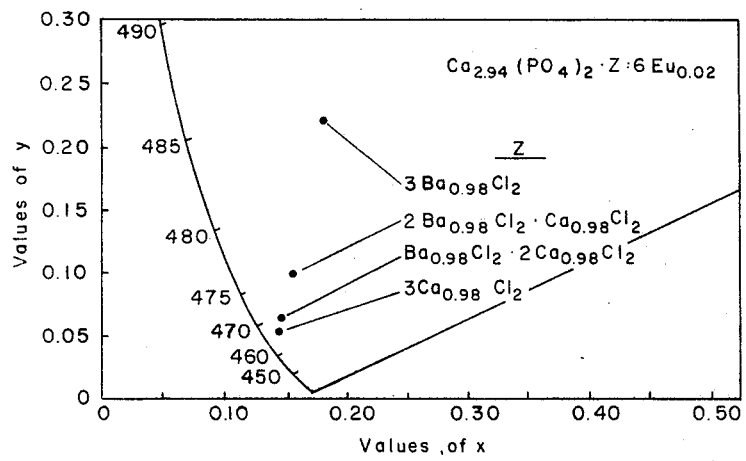
Figure 5:
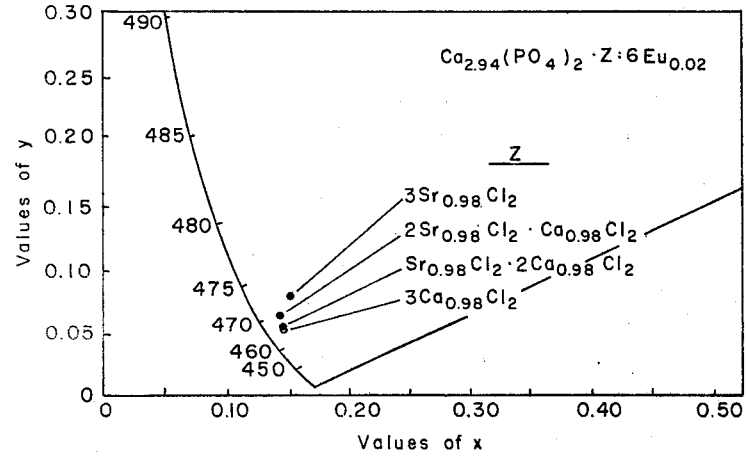
Figure 6:
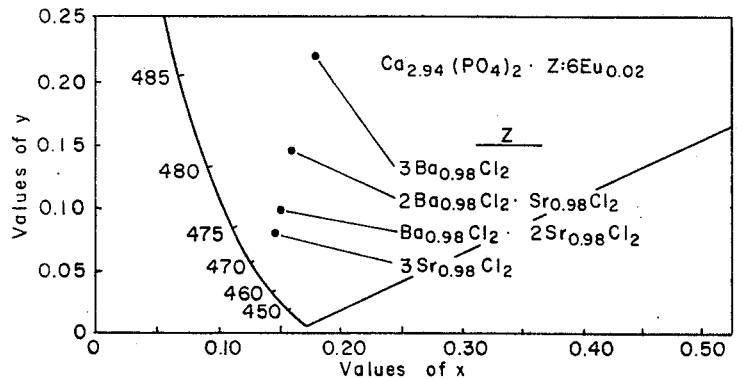

Table VI and FIGS. 4–6 provide color coordinate data for a second group of phosphor formulations.

TABLE VI

| $Ca_{2.94}(PO_4)_2 \cdot Z:6\ Eu^{2+}_{0.02}$ | | C.I.E. color coordinates | |
|---|---|---|---|
| Z | Figure | $x$ | $y$ |
| 3 $Ba_{0.98}Cl_2$ | 4 | 0.178 | 0.219 |
| 2 $Ba_{0.98}Cl_2 \cdot Ca_{0.98}Cl_2$ | 4 | 0.152 | 0.100 |
| $Ba_{0.98}Cl_2 \cdot 2\ Ca_{0.98}Cl_2$ | 4 | 0.146 | 0.063 |
| 3 $Ca_{0.98}Cl_2$ | 4 | 0.144 | 0.053 |
| 3 $Sr_{0.98}Cl_2$ | 5 | 0.149 | 0.079 |
| 2 $Sr_{0.98}Cl_2 \cdot Ca_{0.98}Cl_2$ | 5 | 0.145 | 0.064 |
| $Sr_{0.98}Cl_2 \cdot 2\ Ca_{0.98}Cl_2$ | 5 | 0.144 | 0.054 |
| 3 $Ca_{0.98}Cl_2$ | 5 | 0.144 | 0.053 |
| 3 $Ba_{0.98}Cl_2$ | 6 | 0.178 | 0.219 |
| 2 $Ba_{0.98}Cl_2 \cdot Sr_{0.98}Cl_2$ | 6 | 0.159 | 0.147 |
| $Ba_{0.98}Cl_2 \cdot 2\ Sr_{0.98}Cl_2$ | 6 | 0.151 | 0.097 |
| 3 $Sr_{0.98}Cl_2$ | 6 | 0.149 | 0.079 |

FIGS. 4–6 show that in the phosphors having the formulation $$Ca_{2.94}(PO_4)_2 \cdot Z:6\ Eu^{2+}_{0.02}$$

the "$y$" coordinates of the compositions in which Z contains a binary-alkaline earth halide fall between those in which Z consists of a single alkaline earth. This is in contrast to the $$Ba_{2.94}(PO_4)_2 \cdot Z:6\ Eu^{2+}_{0.02}$$

series in which the "y" coordinates of the phosphors containing binary-alkaline earth components in Z fall above those in which Z contains a single alkaline earth element.

Figure 7:
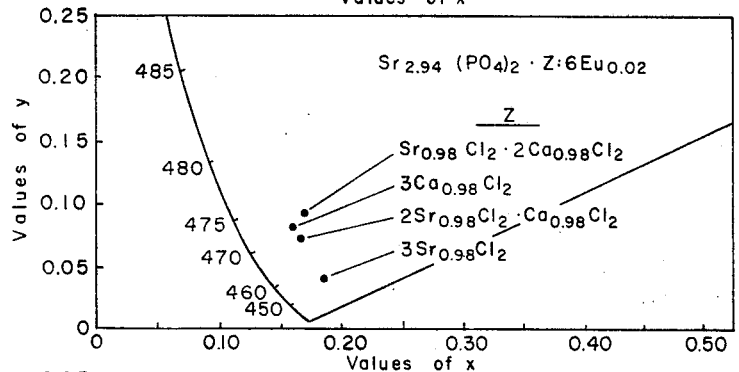
Figure 8:
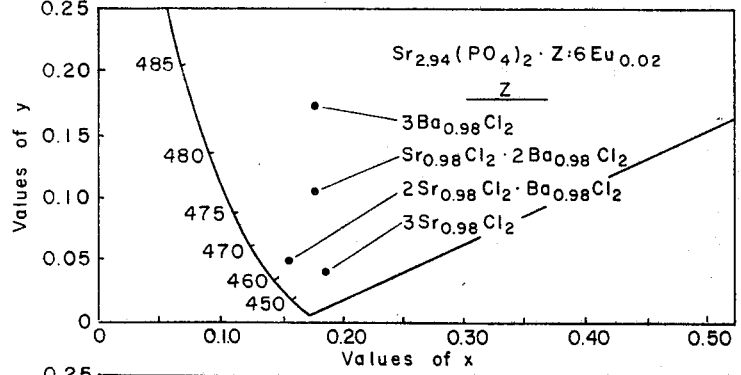
Figure 9:
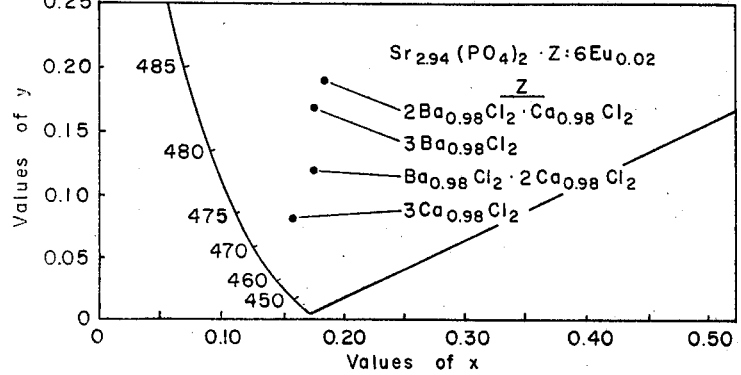

Table VII and FIGS. 7–9 provide color coordinate data for a third group of formulations, $$Sr_{2.94}(PO_4)_2 \cdot Z:6\ Eu^{2+}_{0.02}$$

TABLE VII

| $Sr_{2.94}(PO_4)_2 \cdot Z:6\ Eu^{2+}_{0.02}$ | | C.I.E. color coordinates | |
|---|---|---|---|
| Z | Figure | x | y |
| 3 Sr$_{0.98}$Cl$_2$ | 7 | 0.157 | 0.042 |
| 2 Sr$_{0.98}$Cl$_2$·Ca$_{0.98}$Cl$_2$ | 7 | 0.153 | 0.074 |
| Sr$_{0.98}$Cl$_2$·2Ca$_{0.98}$Cl$_2$ | 7 | 0.154 | 0.091 |
| 3 Ca$_{0.98}$Cl$_2$ | 7 | 0.152 | 0.083 |
| 3 Sr$_{0.98}$Cl$_2$ | 8 | 0.157 | 0.042 |
| 2 Sr$_{0.98}$Cl$_2$·Ba$_{0.98}$Cl$_2$ | 8 | 0.151 | 0.051 |
| Sr$_{0.98}$Cl$_2$·2Ba$_{0.98}$Cl$_2$ | 8 | 0.155 | 0.107 |
| 3 Ba$_{0.98}$Cl$_2$ | 8 | 0.155 | 0.171 |
| 3 Ca$_{0.98}$Cl$_2$ | 9 | 0.152 | 0.083 |
| Ba$_{0.98}$Cl$_2$·2Ca$_{0.98}$Cl$_2$ | 9 | 0.155 | 0.118 |
| 2 Ba$_{0.98}$Cl$_2$·Ca$_{0.98}$Cl$_2$ | 9 | 0.163 | 0.190 |
| 3 Ba$_{0.98}$Cl$_2$ | 9 | 0.155 | 0.171 |

As is evident from FIGS. 7–9, the relationship between the "y" color coordinates and compositions of the phosphors of Table VII follows a different pattern from that of the phosphors shown in FIGS. 1–6.

A notable feature of these phosphors is that the spectral characteristics are such that the "x" coordinates remain relatively constant as the "y" coordinates change as a function of composition. Increasing "y" corresponds to desaturation of the blue color and increased luminosity. In applications which require a blue-emitting phosphor such as color correction in fluorescent lamps and color rendition in television, the efficiency requirements are lessened as the "y" value decreases; i.e., as the color becomes purer or more saturated, less efficiency is required to achieve color correction in a lamp or color balance in combination with other light emitting components in a color television tube.

EXAMPLE VII

A group of phosphors was prepared by the method of Example I in which several alkaline earth halides and combinations thereof were employed. These phosphors had the formulation $$Ba_{2.97}(PO_4)_2 \cdot 2Ba_{0.99}R_2:5\ Eu^{2+}_{0.01}$$

where R is Cl, F, Br, I or combinations thereof. Table VIII lists the phosphor formulations and the relative brightness of the resulting phosphor.

TABLE VIII

| $Ba_{2.97}(PO_4)_2 \cdot 2Ba_{0.99}R_2:5\ Eu^{2+}_{0.01}$ R | Relative brightness, percent |
|---|---|
| Cl | 100.0 |
| Cl$_{0.9}$, F$_{0.1}$ | 97.0 |
| F | 12.7 |
| Br | 64.5 |
| I | 7.89 |
| Cl$_{0.9}$, Br$_{0.1}$ | 66.0 |
| Cl$_{0.9}$, I$_{0.1}$ | 70.0 |

EXAMPLE VIII

A series of phosphors having the initial formulation $Sr_{2.97}(PO_4)_2 \cdot 2Ca_{0.99}Cl_2:5A_{0.01}$, where A is europium, thulium, holmium, erbium, dysprosium, samarium, gadolinium, ytterbium, cerium, praseodymium, neodymium and terbium, were prepared by the method of Example I. It was found that holmium and neodymium compositions emit no noticeable luminescence while thulium, erbium, samarium, gadolinium and praseodymium materials were very faint. However, the luminescence from dysporsium, ytterbium, cerium and terbium acti- vated phosphors under cathode ray excitation was found to be within a useful range. Trivalent dysprosium produced a phosphor having a brightness 97% that of the same host activated by divalent europium. Relative brightness is given in Table IX.

TABLE IX

| $Sr_{2.97}(PO_4)_2 \cdot 2\ Ca_{0.99}\ Cl_2:5\ A_{0.01}$ A | Relative brightness | Color |
|---|---|---|
| Eu$^{2+}$ | 100.0 | Blue. |
| Dy$^{3+}$ | 97.0 | Off-white |
| Yb$^{2+}$ | 33.0 | Yellow. |
| Ce$^{3+}$ | 11.0 | Blue [1]. |
| Tb$^{3+}$ | 33.0 | Green. |

[1] Ce$^{3+}$ also exhibits a broad emission in the lower ultraviolet region.

Example IX 7.76 grams Ca$_3$(PO$_4$), 8.32 grams CaCl$_2$ and 0.29 gram Eu$_2$O$_3$ were dry blended and then fired in a molybdenum crucible at a temperature of approximately 1000° C., in a 100% hydrogen atmosphere for two hours. The sample was allowed to cool to room temperature after which the melt was removed and washed in hot water. Following washing, it was dried and sieved through a 200 mesh screen. The resulting material was found by X-ray analysis to have a spodiosite structure of the formula $$Ca_3(PO_4)_2 \cdot CaCl_2:\ 4Eu^{2+}_{0.1}$$

When excited with cathode rays, the phosphor exhibited a luminescent intensity corresponding to 40% of the intensity of the standard blue phosphor, ZnS:Ag. The chromaticity coordinates of the spodiosite phosphor are $x=0.149$, $y=0.044$ as compared to $x=0.149$, $y=0.058$ for the silver activated zinc sulfide standard. Compared to its apatite analogue, the new phosphor exhibits similar cathodoluminescent and photoluminescent properties.

Another mixture which, when fired under the above conditions, yields the spodiosite form of the halophosphate consists of 13.470 grams CaH PO$_4$, 10.988 grams CaCl$_2$ and 0.352 gram Eu$_2$O$_3$. Chemical analysis by X-ray fluorescence confirmed the spodiosite structure. The photoluminescent and cathodoluminescent characteristics of this phosphor were the same as for the prior example.

Summarizing, I have invented a method of making halogenated alkaline earth phosphate host materials activated by selected elements of the lanthanide series wherein the cationic species may include a simple unary, binary or ternary combination of alkaline earth elements. In this method, the ingredients are blended in quantities which produce a ratio of alkaline earth halide to alkaline earth phosphate in a ratio between 1 and 3. The blend is then fired in substantially pure hydrogen, cooled and washed. Washing removes the excess halide resulting in a final phosphor composition in which the ratio of alkaline earth halide to alkaline earth phosphate is either one-third or unity. These materials are particularly responsive to stimulation by ultraviolet radiation, X-rays or cathode rays and may be used in fluorescent lighting and cathode ray tube applications.

What is claimed is:

1. A method of preparing lanthanide activated halogenated alkaline earth phosphate phosphors defined by the formula $wM_{3(1-x)}(PO_4)_2 \cdot yM'_{(1-x)}R_2:(3w+x)A_x$, where M and M' are alkaline earth elements, R is an ion selected from the halogen group, A is an activator selected from the group consisting of divalent europium, divalent ytterbium, trivalent terbium, trivalent dysprosium, trivalent cerium, the ratio of y to w is either approximately one-third or approximately unity, and x has a value selected to produce fluorescence when the composition is excited by cathode ray, ultraviolet or X-ray radiation, said method comprising the steps of (a) blending an alkaline earth phosphate, an alkaline earth halide and a lanthanide compound selected from the group consisting of the lanthanide oxides and lanthanide salts, said blend providing a ratio of alkaline earth halide to alkaline earth phosphate in the range 1 to 3;
(b) firing said blend in substantially pure hydrogen, and
(c) washing said fired blend to remove excess alkaline earth halide thereby producing an alkaline earth phosphor defined by said formula.

2. The method of preparing lanthanide activated halogenated alkaline earth phosphate phosphor defined by claim 1 wherein the blend is fired in a substantially pure hydrogen atmosphere at a temperature in the range 800° C. to 1400° C.

3. The method of preparing lanthanide activated halogenated alkaline earth phosphate phosphor defined by claim 1 wherein said alkaline earths are selected from the group consisting of strontium, barium and calcium.

4. The method of preparing lanthanide activated halogenated alkaline earth phosphate phosphor defined by claim 1 wherein said lanthanide compound is selected from the groups consisting of the oxides and salts of europium, ytterbium, dysprosium, terbium and cerium.

5. The method of preparing lanthanide activated halogenated alkaline earth phosphate phosphor defined by claim 1 wherein said lanthanide compound is europium oxide.

6. A phosphor system consisting essentially of compositions having the spodiosite structure defined by the formula $wM_{3(1-x)}(PO_4)_2 \cdot yM'_{(1-x)}R_2:(3w+y)A_x$ where M and M' are alkaline-earth elements, R is an ion selected from the halogen group, A is an activator selected from the group consisting of trivalent dysprosium, divalent ytterbium, trivalent cerium and trivalent terbium, the ratio of $y$ to $w$ is approximately unity, and $x$ has a value selected to produce fluorescence when the composition is excited by cathode ray, ultraviolet or X-ray radiation.

7. The phosphor system defined by claim 6 wherein M and M' are predominantly calcium.

8. The phosphor system defined by claim 6 wherein $x$ is in the range 0.0025 to 0.10 gram atom per gram atom of each host cation M+M'.

References Cited

UNITED STATES PATENTS

| | | | |
|---|---|---|---|
| 3,014,874 | 12/1961 | Ranby | 252—301.4 |
| 3,378,354 | 4/1968 | Hickok | 252—301.4 |
| 3,378,499 | 4/1968 | Hickok | 252—301.4 |

TOBIAS E. LEVOW, Primary Examiner

R. D. EDMONDS, Assistant Examiner